(12) United States Patent
Van Der Veen et al.

(10) Patent No.: US 7,639,599 B2
(45) Date of Patent: Dec. 29, 2009

(54) EMBEDDING SUPPLEMENTARY DATA IN AN INFORMATION SIGNAL

(75) Inventors: Minne Van Der Veen, Eindhoven (NL); Jaap Andre Haitsma, Eindhoven (NL); Antonius Adrianus Cornelis Maria Kalker, Eindhoven (NL); Alphons Antonius Maria Lambertus Bruekers, Eindhoven (NL)

(73) Assignee: Civolution B.V., Eindhoven (NL)

( * ) Notice: Subject to any disclaimer, the term of this patent is extended or adjusted under 35 U.S.C. 154(b) by 1000 days.

(21) Appl. No.: 10/495,282

(22) PCT Filed: Oct. 28, 2002

(86) PCT No.: PCT/IB02/04541

§ 371 (c)(1),
(2), (4) Date: May 12, 2004

(87) PCT Pub. No.: WO03/043003

PCT Pub. Date: May 22, 2003

(65) Prior Publication Data

US 2004/0257977 A1 Dec. 23, 2004

(30) Foreign Application Priority Data

Nov. 16, 2001 (EP) ................... 01204386

(51) Int. Cl.
*H04J 11/00* (2006.01)
(52) U.S. Cl. .................... 370/207; 370/210
(58) Field of Classification Search ........... 370/207, 370/210–211, 213, 286, 289; 379/388.03, 379/388.06, 390.01, 390.03, 392, 395, 403–404, 379/406.01, 406.13
See application file for complete search history.

(56) References Cited

U.S. PATENT DOCUMENTS

| 5,319,735 | A | | 6/1994 | Preuss et al. | |
|---|---|---|---|---|---|
| 5,940,429 | A | | 8/1999 | Lam et al. | |
| 5,978,762 | A | * | 11/1999 | Smyth et al. | 704/229 |
| 6,233,347 | B1 | * | 5/2001 | Chen et al. | 382/100 |
| 6,396,937 | B2 | * | 5/2002 | Chen et al. | 382/100 |
| 6,400,826 | B1 | * | 6/2002 | Chen et al. | 382/100 |
| 7,113,615 | B2 | * | 9/2006 | Rhoads et al. | 382/100 |
| 2003/0128861 | A1 | * | 7/2003 | Rhoads | 382/100 |
| 2003/0231785 | A1 | * | 12/2003 | Rhoads et al. | 382/100 |

FOREIGN PATENT DOCUMENTS

EP    0766468 A1    4/1997

OTHER PUBLICATIONS

Veen Van Der M et al. "Robust, Multi-Functional and High-Quality audio watermarking technology" preprints of papers presented at the AES convention XX,XX vol. 110, No. 5345, May 12, 2001, pp. 1-9, XP001086463.

(Continued)

*Primary Examiner*—Binh K Tieu
(74) *Attorney, Agent, or Firm*—Barnes & Thornburg LLP

(57) ABSTRACT

Disclosed is a method of adjusting a supplementary data signal (wm(n)) to be embedded in an information signal (x(n)), for example an audio signal. The method comprises the steps of determining (301) a position where a predetermined property of the information signal exceeds a predetermined threshold, e.g. an attack position, and suppressing (302) the supplementary data signal in a predetermined neighbourhood of the determined position.

10 Claims, 3 Drawing Sheets

OTHER PUBLICATIONS

Figure 1:
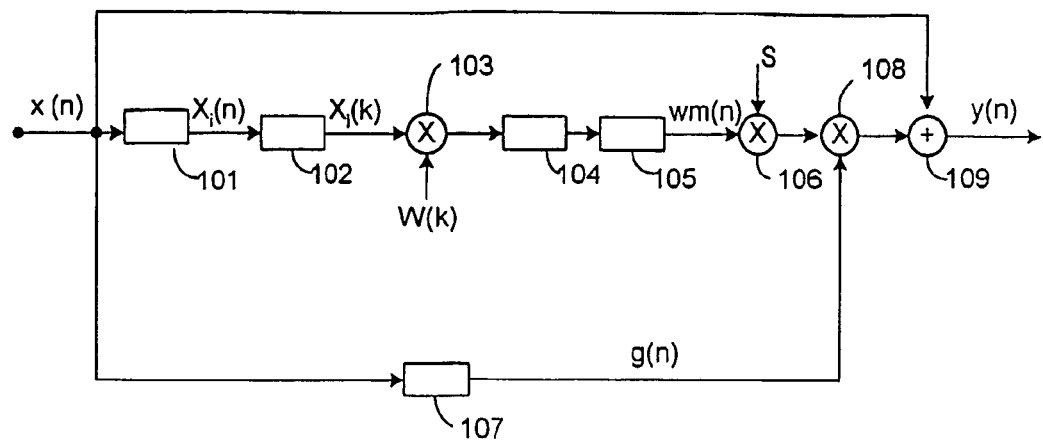

Swanson et al, "Robust audio watermarking using perceptual masking", Signal Processing 66, 1998, pp. 337-355.

E. Zwicker et al., "Psychoacoustics, Facts and Models", Springer, Berlin, Heidelberg, 1990.

Seungwon Shin et al., "A Robust Audio Watermarking Algorithm Using Pitch Scaling", Digital Signal Processing, 2002, DSP 2002, 14th Int'l Conf. on Santorini, Greece, IEEE, US Jul. 2002., pp. 701-704, XP002256338.

* cited by examiner

EMBEDDING SUPPLEMENTARY DATA IN AN INFORMATION SIGNAL

This invention relates to embedding supplementary data in an information signal and, more specifically, to adjusting a supplementary data signal to be embedded in an information signal.

In recent years, an increasing trend towards the use and distribution of digital multimedia data has led to an increased need for adequate copy protection, copyright protection, and ownership verification of such data.

Digital watermarking is an emerging technology that may be used for a variety of purposes, such as proof of copyright ownership, tracing of illegal copies, controlling copy control equipment, broadcast monitoring, authenticity verification, adding auxiliary information into multimedia signals, etc.

A watermark comprises supplementary data which is embedded in an information signal by slightly modifying samples of the signal. Preferably, a watermarking scheme should be designed such that the watermark is imperceptible, i.e. that it does not affect the quality of the information signal significantly.

Within the field of watermarking audio signals a number of embedding algorithms are known. For example, in transform-based algorithms coefficients of a digital audio signal are transformed from a time domain into a frequency domain, the coefficients of the transformed signal are modified corresponding to a supplementary data signal, and the modified coefficients are transformed back into the time domain. A general problem of the known approaches is their lack of resolution in the temporal domain. Consequently the supplementary data signal may spread out in time and may introduce perceptible distortions.

In "Robust audio watermarking using perceptual masking", by M. D. Swanson et al. (Signal Processing 66 (1998) 337-355) a method is disclosed where a temporal gain function is calculated on the basis of the audio signal by modelling the envelope of the host audio signal as a decaying exponential. The calculated gain function is multiplied to the supplementary data signal prior to its embedding, resulting in a continuous modification of the watermark signal.

However, the above prior art method involves the problem that it may lead to undesired side effects resulting in audible distortions.

The above problem is solved by a method of adjusting a supplementary data signal to be embedded in an information signal, the method comprising the steps of determining a position where a predetermined property of the information signal exceeds a predetermined threshold; and suppressing the supplementary data signal in a predetermined neighbourhood of the determined position.

Consequently, according to the invention, the supplementary data signal is only modified in predetermined neighbourhoods of detected positions, thereby improving the embedding performance in terms of detection quality versus perceptual quality. This is based on the recognition that the undesired side effects of the above prior art method are caused by the continuous modification of a watermark signal. This may be illustrated by considering the example of a stationary signal of one sinusoid. A continuous modification of this single frequency signal is equivalent to a modulation. This, in turn, means that noise that was initially masked may move outside the frequency band of the sinusoid and therefore become audible. Consequently, by only modifying the watermark signal in the neighbourhood of distinct locations the imperceptibility of the watermark signal is improved, thereby yielding a simple and effective gain function.

It is a further advantage of the invention, that it provides a computationally efficient method of adjusting the supplementary data signal, since the supplementary data signal is only modified in the neighbourhood of the determined positions.

According to a preferred embodiment of the invention, the predetermined property is a change in amplitude. Consequently, positions with amplitude changes larger than a predetermined threshold, i.e. strong and sudden amplitude changes, are determined. Hence, distortions in connection with these amplitude changes, so-called 'attacks' or 'transients', are suppressed by a method according to the invention.

According to a further preferred embodiment of the invention, the information signal is represented as a temporal sequence of signal samples and the step of suppressing the supplementary data signal comprises the step of suppressing the supplementary data signal for a first number of samples before the determined position and for a second predetermined number of samples after the detected position.

Consequently, both pre-echo distortions and post-echo distortions in the neighbourhood of the determined position are suppressed. Preferably, the first and second number of samples are selected to account for the respective perceptibility of pre- and post echo effects.

According to a further preferred embodiment of the invention, the second number of samples is substantially zero. Consequently, according to this embodiment of the invention, only pre-echo distortions are suppressed. As the human auditory system (HAS) is considerably more sensitive to pre-echo distortions, the suppression of pre-echo distortions alone yields a considerable improvement of the imperceptibility of the supplementary data signal. Hence, it is an advantage of this embodiment of the invention, that it results in a further improved performance in terms of detection results versus perceptual quality.

According to another preferred embodiment of the invention, the step of suppressing the supplementary data signal further comprises the step of applying a taper function to the supplementary data signal at a boundary of the predetermined neighbourhood. Hence the suppression of the supplementary data signal is smoothly turned on/off at the borders of the neighbourhood of the determined positions, i.e. the amplitude of the supplementary data signal is decreased/increased over a number of samples, thereby improving the perceptual quality of the signal. A variety of known taper functions may be used for smoothly increasing/decreasing the signal. An example of such a taper function is a function which is differentiably increasing from 0 to 1, for example a cosine taper.

The invention further relates to an arrangement for adjusting a supplementary data signal to be embedded in an information signal, the arrangement comprising means for determining a position where a predetermined property of the information signal exceeds a predetermined threshold; and means for suppressing the supplementary data signal in a predetermined neighbourhood of the determined position.

The invention further relates to a device for embedding a supplementary data signal in an information signal, the device comprising an arrangement for adjusting a supplementary data signal to be embedded in an information signal, the arrangement comprising means for determining a position where a predetermined property of the information signal exceeds a predetermined threshold; and means for suppressing the supplementary data signal in a predetermined neighbourhood of the determined position.

The invention further relates to an information signal having embedded therein a supplementary data signal, wherein the supplementary data signal has been adjusted by a method comprising the steps of determining a position where a predetermined property of the information signal exceeds a predetermined threshold; and suppressing the supplementary data signal in a predetermined neighbourhood of the determined position.

The information signal may be embodied as a communications signal in a communications network, such as an intranet, extranet, internet, a local area net, a wireless or wired network, etc.

The information signal may further be stored on a storage medium. The term storage medium may include magnetic tape, optical disc, digital video disk (DVD), compact disc (CD or CD-ROM), mini-disc, hard disk, floppy disk, ferro-electric memory, electrically erasable programmable read only memory (EEPROM), flash memory, EPROM, read only memory (ROM), static random access memory (SRAM), dynamic random access memory (DRAM), synchronous dynamic random access memory (SDRAM), ferromagnetic memory, optical storage, charge coupled devices, smart cards, PCMCIA card, etc.

Figure 3:
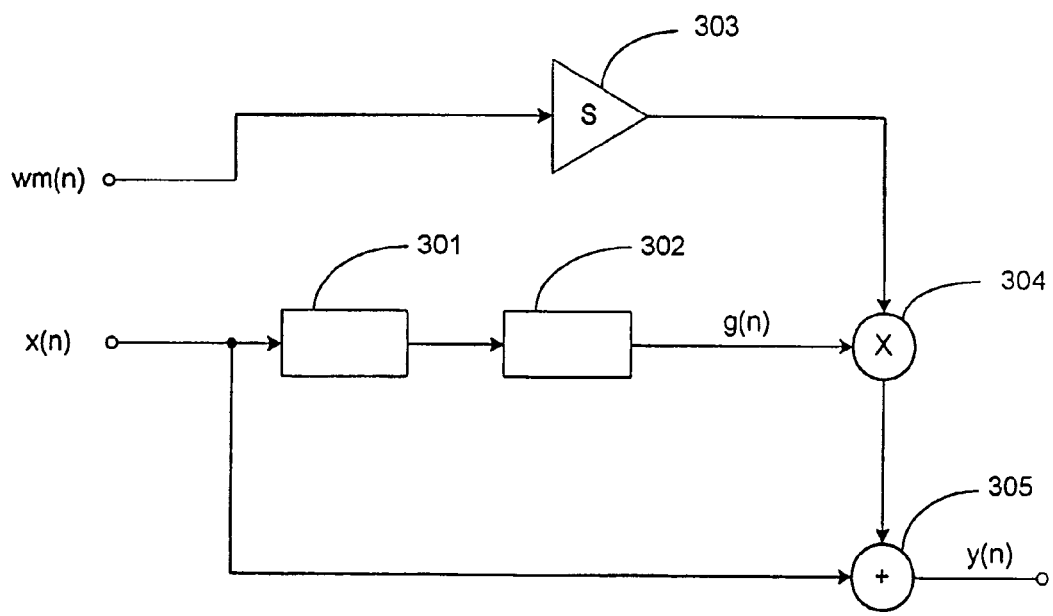
Figure 2A:
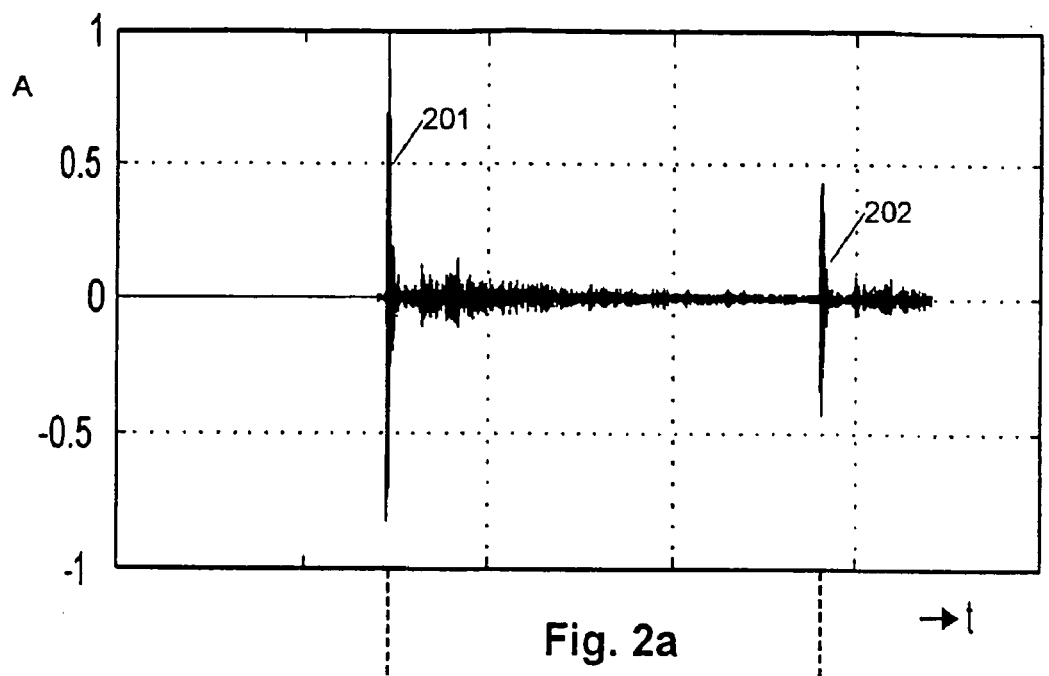
Figure 2B:
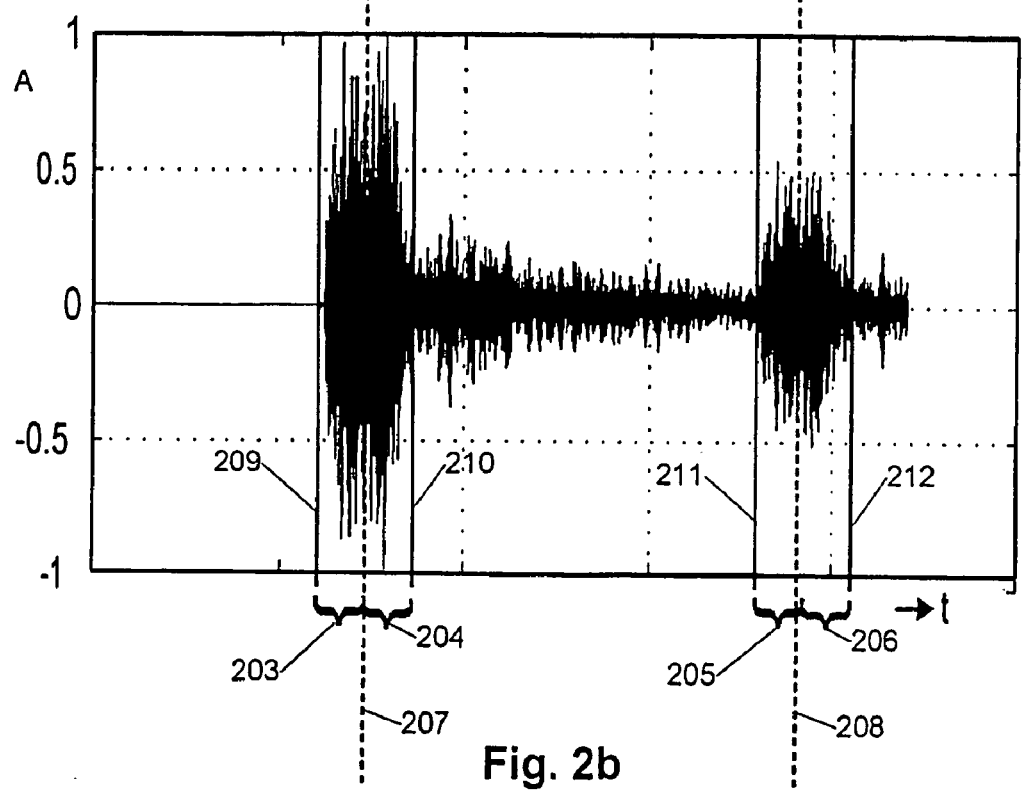
Figure 4A:
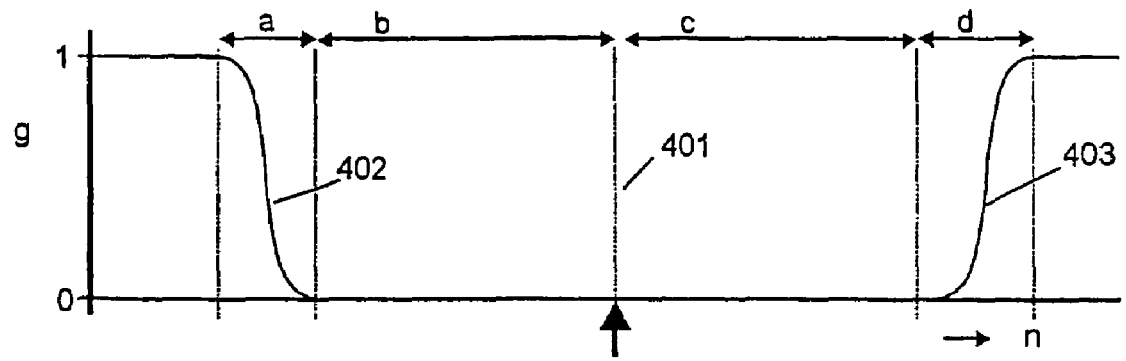
Figure 4B:
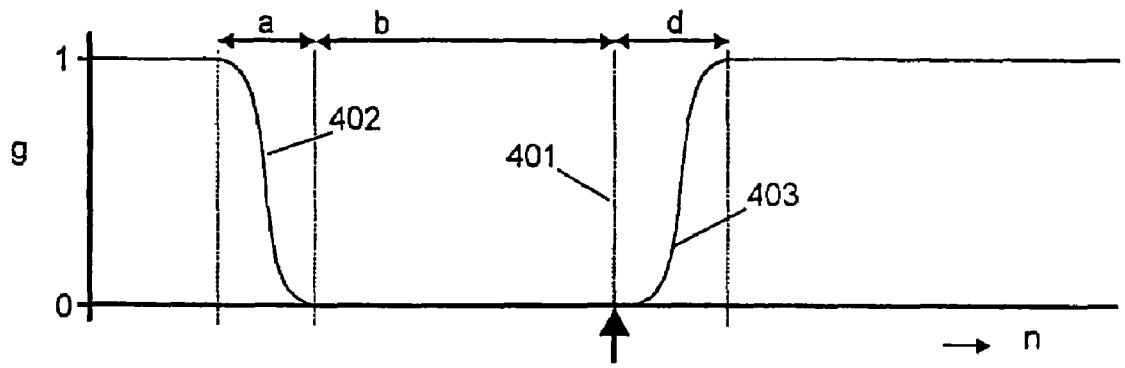
Figure 5:
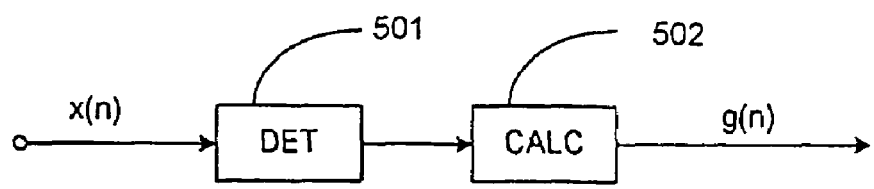

These and other aspects of the invention will be apparent from and elucidated with reference to the embodiments and with reference to the drawings, in which:

FIG. 1 shows a schematic view of an arrangement for embedding a watermark in an information signal according to an embodiment of the invention;

FIGS. 2a-b illustrate the effect of pre- and post-echo distortions in connection with a supplementary data signal embedded in a host audio signal with strong and sudden amplitude changes;

FIG. 3 shows a schematic diagram of a method of adjusting a supplementary data signal according to an embodiment of the invention;

FIGS. 4a-b illustrate examples of temporal gain functions according to an embodiment of the invention; and FIG. 5 shows a schematic view of an arrangement for adjusting a supplementary data signal according to an embodiment of the invention.

FIG. 1 shows a schematic view of an arrangement for embedding a watermark in an information signal according to an embodiment of the invention. The arrangement comprises circuitry 101 adapted to segment the host audio signal x(n) into frames $x_i(n)$ and circuitry 102 adapted to transform the frames into the Fourier domain resulting in Fourier coefficients $X_i(k)$, e.g. by applying a Fast Fourier Transform (FFT). The arrangement further comprises a multiplier circuit 103 adapted to slightly modify the Fourier coefficients $X_i(k)$ of each frame according to a watermark sequence W(k), yielding the watermark samples $X_i(k) \cdot W(k)$. The watermark sequence W(k) may be a pseudo-random sequence, e.g. a normally distributed pseudo-random sequence with zero mean and unit standard deviation. The arrangement further comprises circuitry 104 adapted to transform the watermarked samples $X_i(k) \cdot W(k)$ into the temporal domain, e.g. by applying an Inverse Fast Fourier Transform (IFFT). Subsequently, the watermark segments are concatenated by circuitry 105 to obtain a reconstructed watermark signal wm(n) which is multiplied with an overall embedding strength s by the multiplier circuit 106. The arrangement further comprises circuitry 107 adapted to calculate a temporal gain function g(n) which is multiplied with the scaled watermark signal s·wm(n) by the multiplier 108. Finally the scaled watermark signal s·g(n)·wm(n) is added to the host audio signal x(n) by the adder 109, resulting in the watermark audio signal y(n)=x(n)+s·g(n)·wm(n).

It is noted that the multiplication in frequency domain, $W(k) \cdot X_i(k)$, corresponds to a cyclic convolution in time domain. Hence, the watermark signal in any given frame i may be expressed as $wm_i(n) = w(n) \hat{\times} x_i(n)$, where w(n) is a corresponding watermark signal in the temporal domain.

However, during the step of transforming a watermark frame back into the temporal domain by circuitry 104, watermark energy may spread out over the entire frame. This effect may cause perceptible distortions, in particular in the presence of strong and sudden amplitude changes, as will be illustrated in connection with FIGS. 2a-b. By multiplying the watermarked signal with a suitably chosen gain function g(n), the temporal characteristics of the audio watermark may be improved. A method of calculating such a gain function according to the invention will be described in connection with FIGS. 3 and 4a-b.

It is understood that other types of mathematical transforms may be employed instead of a Fast Fourier Transform. examples of such transforms include, Discrete Fourier Transforms (DFT), Discrete Cosine Transforms (DCT), Wavelet transforms, etc.

It is further understood that other embedding schemes may be employed. For example, an FIR watermark filter calculating a linear convolution may used for calculating watermarked audio signals. In contrast to transform-based algorithms, the calculation of a linear convolution does not comprise a segmentation of the host signal x(n). According to this embodiment, the watermarked audio signal is calculated according to the equation $y(n) = x(n) + s \cdot g(n) \cdot x(n) \circledast w(n)$, where the symbol $\circledast$ denotes a linear convolution, i.e. $x(n) \circledast w(n) = \Sigma_m x(m) w(n-m)$.

Similar to transform-based algorithms as the one described above, an embedding approach based on a linear convolution may suffer from limited temporal resolution and perceptible distortions.

FIGS. 2a-b illustrate the effect of pre- and post-echo distortions in connection with a supplementary data signal embedded in a host audio signal with strong and sudden amplitude changes. FIG. 2a illustrates an example of a host audio signal where the normalised amplitude A is plotted as a function of time t. The audio signal in the example of FIG. 2a represents a short segment of an audio excerpt with castanets which comprises strong and sudden amplitude changes 201 and 202. Such amplitude changes are also referred to as 'attacks' or 'transients'.

FIG. 2b illustrates a watermark signal calculated from the host signal in FIG. 2a according to the method described in connection with FIG. 1, but without the use of a temporal gain function. As can be seen from FIG. 2b, around the locations 207 and 208 of the attacks 201 and 202, respectively, the watermark signal is smeared out over a width corresponding to an analysis frame. The width of an analysis window is indicated by the horizontal lines 209-210 for the attack location 207 and 211-212 for attack location 208, respectively. FIG. 2b further illustrates that the distortions are introduced both before the attack locations, i.e. in the regions 203 and 205, respectively, and after the attack locations, i.e. in the regions 210 and 212, respectively. These distortions may give raise to perceptible pre-echo and post-echo distortions, respectively. Hence, it may be seen from FIGS. 2a-b, that the perceptual distortions introduced by the watermark signal are particularly pronounced in the presence of attacks.

It is an advantage of the invention that it provides a fast and computationally inexpensive method of eliminating perceptual distortions in connection with strong and sudden amplitude changes.

FIG. 3 shows a schematic diagram of a method of adjusting a watermark signal according to an embodiment of the invention. In FIG. 3, it is assumed that a time-domain watermark signal wm(n) has been generated on the basis of the host audio signal x(n), for example according to one of the methods described in connection with FIG. 1. The overall weight of the watermark is determined by multiplying 303 the watermark signal wm(n) with the embedding strength s. According to the invention the adjustment of the watermark signal involves the following steps:

Determine Attack Positions (step 301): Initially, attack positions are detected in the host audio signal x(n). The attack positions may be determined by known methods of determining attack positions. For example, the amplitudes of the host signal x(n) within a moving window of a predetermined size may be compared and, if a change in amplitude occurs which exceeds a predetermined threshold, the amplitude change is considered an attack, and the attack position is determined by the position of the moving window. The preferred size of the moving window may depend on the distance between attacks in the audio signal. For example, the window may have a size of the order of 2-10 milliseconds. Alternatively, other methods for attack detection may be used, e.g. by extracting features from the signal envelope. Alternatively or additionally, a high-pass filtered version $x_{hp}(n)$ of the host signal may be used as a basis for the attack detection. As the attacks correspond to a high-frequency effect within a slowly varying signal, a high-pass filtering of the audio signal prior to the attack detection may improve the attack detection. According to an alternative embodiment, an attack position may be defined by a location where an attack is detected in both the audio signal and the high-pass filtered signal $x_{hp}(n)$.

Derive Temporal Gain Function (step 302): Based on the detected attack positions, a temporal gain function g(n) is derived which suppresses the watermark signal in predetermined neighbourhoods around the detected locations. An embodiment of the resulting gain function is described in connection with FIGS. 4a-b.

Apply Gain Function: The gain function g(n) is multiplied with the scaled watermark (step 304), and subsequently added to the host signal (step 305), resulting in the watermarked signal y(n).

FIGS. 4a-b illustrate examples of temporal gain functions according to an embodiment of the invention. FIG. 4a illustrates a gain function g(n) in the vicinity of a detected attack position 401. The gain function is shown as a function of the signal samples n, and the gain function can obtain values in the interval [0;1], where the value 0 corresponds to a complete suppression of the watermark signal and the value 1 corresponds to no suppression of the watermark signal. In the example of FIG. 4a, it is assumed that an attack has been detected in the corresponding host signal at position 401. According to an embodiment of the invention, the gain function is set to zero within a predetermined neighbourhood of the detected attack position 401, indicated by the regions b and c in FIG. 4a. Preferred choices of the sizes of the regions b and c may depend on the length of the watermark signal w(n) or the length of the frame size used in the segmentation described in connection with FIG. 1. For a linear phase watermark filter w(n), b and c may, preferably, be chosen to be approximately half the filter length or longer. The filter length itself depends on the sampling frequency. For a sampling frequency of 44.1 kHz, the values for b and c may, for example, be chosen between 256 to 2048. Consequently, all significant distortions on both sides of the attack position (i.e. pre- and post echoes) are suppressed. Outside the regions b and c, the gain function g(n) is decreased/increased from/to 1. Preferably, this transition is performed smoothly, i.e. by applying a decreasing taper function 402 which decreases from 1 to 0 over an interval a, and an increasing taper function 403 which increases from 0 to 1 over an interval d. The length of the intervals a and d may, for example, be chosen to be between 1-20 milliseconds or longer. An example of a taper function for switching the gain function from 1 to 0 and back to 1 is the cosine function. Alternatively, other functions may be used, for example functions which increase/decrease monotonously and differentiably. In regions without detected attack positions, the gain function is set to 1.

It is noted that, alternatively to setting the gain function to zero, the gain function may be set to a small value close to zero. Alternatively or additionally, the gain function may even vary over the intervals b and c, for example in order to adapt the gain function to the characteristics of the host signal.

FIG. 4b illustrates another example of a temporal gain function g(n). As in FIG. 4a, the presence of an attack position is assumed at location 401, and a gain function with values in the interval [0;1] is defined where g(n) is set to zero in a neighbourhood of the attack position. According to this embodiment of the invention, the gain function is set to zero only in the region b to the left of the attack position. As in FIG. 4a, taper functions 402-403 are applied in the regions a and d, respectively, for ensuring a smooth transition between regions where g(n)=1 and g(n)=0. According to this embodiment of the invention, only pre-echo distortions are suppressed by the gain function. It is an advantage of this embodiment of the invention that more watermark energy may be inserted in the final signal as with the gain function of FIG. 4a, without significantly reducing the perceptual quality of the signal. This is because the HAS is considerably more sensitive to pre-echoes than post-echoes (see e.g. E. Zwicker and H. Fastl, "Psychoacoustics, Facts and Models", Springer, Berlin, Heidelberg, 1990). Consequently, the embodiment of FIG. 4b results in improved performance in terms of detection results versus perceptual quality.

FIG. 5 shows a schematic view of an arrangement for adjusting a supplementary data signal according to an embodiment of the invention. FIG. 5 shows an embodiment of the gain function calculation circuit 107 according to the invention. The arrangement comprises a circuit 501 adapted to detect attack positions in the host audio signal x(n) as described in connection with FIG. 3, and a circuit 502 adapted to generate a signal representing the gain function g(n) calculated as described in connection with FIGS. 3 and 4a-b.

It is understood that the above arrangement may be implemented by any processing unit, e.g. a programmable microprocessor, an application-specific integrated circuit, or another integrated circuit, a smart card, or the like.

It should further be noted that the invention has been described in connection with an embodiment of the invention in the field of watermarking of audio signals. However, it is understood, that the method may be applied to embed other supplementary data into other types of host signals as well, such as multimedia signals, video signals, animations, graphics, still images, or the like. In some embodiments the host signal may be represented in other domains than the temporal domain, such as a spatial domain in connection with pictures, and the notion of amplitude may be replaced by other quantities, such as brightness, intensity, or the like.

It should further be noted that the invention may be applied in connection with a variety of applications where supplementary data signals are embedded in an information signal. For example, in the field of watermarking, supplementary data signals may be embedded as proof of copyright ownership, tracing of illegal copies, controlling copy control equipment, broadcast monitoring, authenticity verification, adding auxiliary information into multimedia signals, etc. As an example, audio watermarks may be embedded in an audio signal by a recorder or other device prior to the distribution of the audio signal, e.g. as a communication signal, stored on a storage medium, or the like.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word 'comprising' does not exclude the presence of other elements or steps than those listed in a claim. The invention can be implemented by means of hardware comprising several distinct elements, and by means of a suitably programmed computer. In a device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of adjusting a supplementary data signal in a processing unit to be embedded in an information signal, the method comprising
   determining, by the processing unit, a position where a predetermined property of the information signal exceeds a predetermined threshold; and
   suppressing, by the processing unit, the supplementary data signal in a predetermined neighborhood of the determined position.

2. The method of claim 1, wherein the predetermined property is a change in amplitude.

3. The method of claim 1, wherein the information signal is represented as a temporal sequence of signal samples and the suppressing the supplementary data signal comprises suppressing the supplementary data signal for a first number of samples before the determined position and for a second predetermined number of samples after the detected position.

4. The method of claim 3, wherein the second number of samples is substantially zero.

5. A storage medium having recorded thereon a temporal sequence of signal samples representing an information signal having embedded therein a supplementary data signal according to claim 3.

6. The method of claim 1, wherein the suppressing the supplementary data signal further comprises the step of applying a taper function to the supplementary data signal at a boundary of the predetermined neighborhood.

7. The method of claim 6, wherein the taper function is a cosine taper function.

8. The method of claim 1, wherein the information signal comprises a digital audio signal.

9. An arrangement for adjusting a supplementary data signal in a processing unit to be embedded in an information signal, the arrangement comprising
   means for determining a position where a predetermined property of the information signal exceeds a predetermined threshold; and
   means for suppressing the supplementary data signal in a predetermined neighborhood of the determined position,
   wherein the means for determining and means for suppressing are both part of the processing unit.

10. A device for embedding a supplementary data signal in an information signal, the device comprising an arrangement implemented in a processing unit for adjusting a supplementary data signal using the processing unit to be embedded in an information signal, the arrangement comprising
   means for determining a position where a predetermined property of the information signal exceeds a predetermined threshold; and
   means for suppressing the supplementary data signal in a predetermined neighborhood of the determined position,
   wherein the means for determining and means for suppressing are both part of the processing unit.

* * * * *